United States Patent
Wolff

(10) Patent No.: US 11,518,248 B2
(45) Date of Patent: Dec. 6, 2022

(54) VEHICLE POWER DELIVERY ASSEMBLY

(71) Applicant: Transportation IP Holdings, LLC, Norwalk, CT (US)

(72) Inventor: Jeffrey John Wolff, Erie, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 383 days.

(21) Appl. No.: 16/721,209

(22) Filed: Dec. 19, 2019

(65) Prior Publication Data

US 2021/0188095 A1     Jun. 24, 2021

(51) Int. Cl.
*B60L 5/00*     (2006.01)
*B60L 53/12*    (2019.01)
*H01F 27/28*    (2006.01)

(52) U.S. Cl.
CPC .............. *B60L 5/005* (2013.01); *B60L 53/12* (2019.02); *H01F 27/28* (2013.01); *B60L 2200/30* (2013.01)

(58) Field of Classification Search
CPC ...... B60L 5/005; B60L 53/12; B60L 2200/30; B60L 5/18; B60L 50/53; B60L 9/005; H01F 27/28; Y02T 10/70; Y02T 10/7072; Y02T 90/14
See application file for complete search history.

(56) References Cited

U.S. PATENT DOCUMENTS

2011/0284699 A1* 11/2011 Cooper ................ B61L 3/20
                                                246/28 R
2014/0012446 A1* 1/2014 Kumar .................. B60W 10/08
                                                903/930
2014/0202816 A1   7/2014 Kuo et al.
2017/0174087 A1*  6/2017 El-Barbari ............. B60L 9/04
2021/0114473 A1*  4/2021 Alaküla .................. B60K 1/02

FOREIGN PATENT DOCUMENTS

GB      2460743 A       12/2009
JP      S5118012        2/1976
JP      S6055802        4/1985
KR      1020120029716 A 3/2012

OTHER PUBLICATIONS

Extended European Search Report for related European Patent Application 20215745.9 dated May 14, 2021 (9 pages).
English translation of Office Action received for related Japanese Patent Application No. 2020-209485 dated Aug. 24, 2022 (4 pages).
Office Action received for related Japanese Patent Application No. 2020-209485 dated Aug. 24, 2022 (4 pages).

* cited by examiner

*Primary Examiner* — Lincoln D Donovan
*Assistant Examiner* — Alex W Lam
(74) *Attorney, Agent, or Firm* — The Small Patent Law Group LLC; Josef L. Hoffmann

(57) ABSTRACT

A vehicle power delivery assembly that includes a mast configured to couple with a vehicle such that the mast projects from the vehicle, and a collection arm configured to be coupled with the mast in a location apart from the vehicle to engage an off-board source of electric current that is off-board the vehicle while the vehicle moves along one or more routes. One or more of the mast or the collection arm is formed from at least one inductive support member that provides an integrated inductor of the one or more of the mast or the collection arm through which at least some of the electric current that is received from the off-board source of the electric current is filtered prior to being conducted to the vehicle.

24 Claims, 6 Drawing Sheets

VEHICLE POWER DELIVERY ASSEMBLY

BACKGROUND

Technical Field

Embodiments of the present disclosure generally relate to power delivery assemblies for a vehicle.

Discussion of Art

Trolley assisted vehicles such as rail vehicles, off-highway vehicles (OHV), transit vehicles, etc. may use an off-board source of electric current to power the vehicle. In one example, a vehicle may include a pantograph and accompanying pantograph support structure that contacts a catenary that supplies electrical current to power the vehicle. Alternatively, wayside devices, electrical tracks, or other off-board current sources may supply current through physical contact with a current collection device.

The pantograph support structure may include a mast that is mechanically coupled to the vehicle. The mast includes a current collection device, and may also provide a pathway for electrically coupling the off-board current source to a propulsion system for providing power for the vehicle.

An inductor is used to filter current received from the off-board current source. The inductor is spaced from a collection arm that receives current from the current source for filtering before passing along to a propulsion system. The inductor may include an air core, an iron core, etc., that may need to be cooled with a fan adding additional size and complexity. To this end, the fan may have to include filters and ductwork that must be cleaned and maintained along with the fan. While the inductor may be cross coupled to reduce size, a desire exists to further reduce the size, weight, and cost of the power delivery assemblies of these vehicles.

BRIEF DESCRIPTION

In one embodiment, a vehicle power delivery assembly includes a mast configured to couple with a vehicle such that the mast projects from the vehicle, and a collection arm configured to be coupled with the mast in a location apart from the vehicle to engage an off-board source of electric current that is off-board the vehicle while the vehicle moves along one or more routes. One or more of the mast, or the collection arm, is formed from at least one inductive support member that provides an integrated inductor of the one or more of the mast or the collection arm through which at least some of the electric current that is received from the off-board source of the electric current is filtered prior to being conducted to the vehicle.

In another embodiment, a trolley assembly is provided that includes one or more elongated, structural and inductive support members configured to be coupled with each other and with a vehicle to form a mast. The formed mast projects upwardly from the vehicle, and a collection arm is formed and configured to be coupled with the mast to engage an overhead line of an off-board power source to receive electric current while the vehicle moves along one or more routes. The support members are configured to inductively filter the electric current received from the overhead line prior to the electric current being conducted to a propulsion system of the vehicle.

In yet another embodiment, a vehicle power delivery assembly is provided that includes a collection arm configured to engage an off-board source of electric current that is off-board a vehicle while the vehicle moves along one or more routes. The vehicle power delivery assembly also includes an inductive support structure configured to be coupled with the vehicle such that the inductive support structure projects from the vehicle. The inductive support structure is both mechanically supporting the collection arm above the vehicle and providing an inductor along a conductive pathway of the electric current from the collection arm to a propulsion system of the vehicle.

BRIEF DESCRIPTION OF THE DRAWINGS

The subject matter described herein will be better understood from reading the following description of non-limiting embodiments, with reference to the attached drawings, wherein below.

DETAILED DESCRIPTION

A vehicle power delivery system is provided that may include a pantograph or similar structure for engaging an electrical source. In an example embodiment, a mast is provided that may include a collection arm that engages an electrical line to provide electric current to the vehicle power delivery system. Integrated as part of the structural support of the mast and/or support arm for the pantograph is an inductor that may filter the electrical current received from the electrical line. For example, the structural components forming the pantograph may be formed from inductive members that at least partially or entirely replace the need for an external inductor to filter some frequencies of current received from the catenary. Integrating the inductor as part of the support structure of the mast or collection arm eliminates or reduces the need for a separate spaced inductor, reducing cost, size, and weight of the vehicle power delivery system. The pantograph may also be directly coupled to the vehicle, or may be removably coupled to the vehicle to facilitate maintenance and replacement. By being part of the mast or collection arm, the integrated inductor may be passively cooled to reduce or eliminate the need for forced cooling with a fan, reducing weight and complexity of the system.

Figure 1:
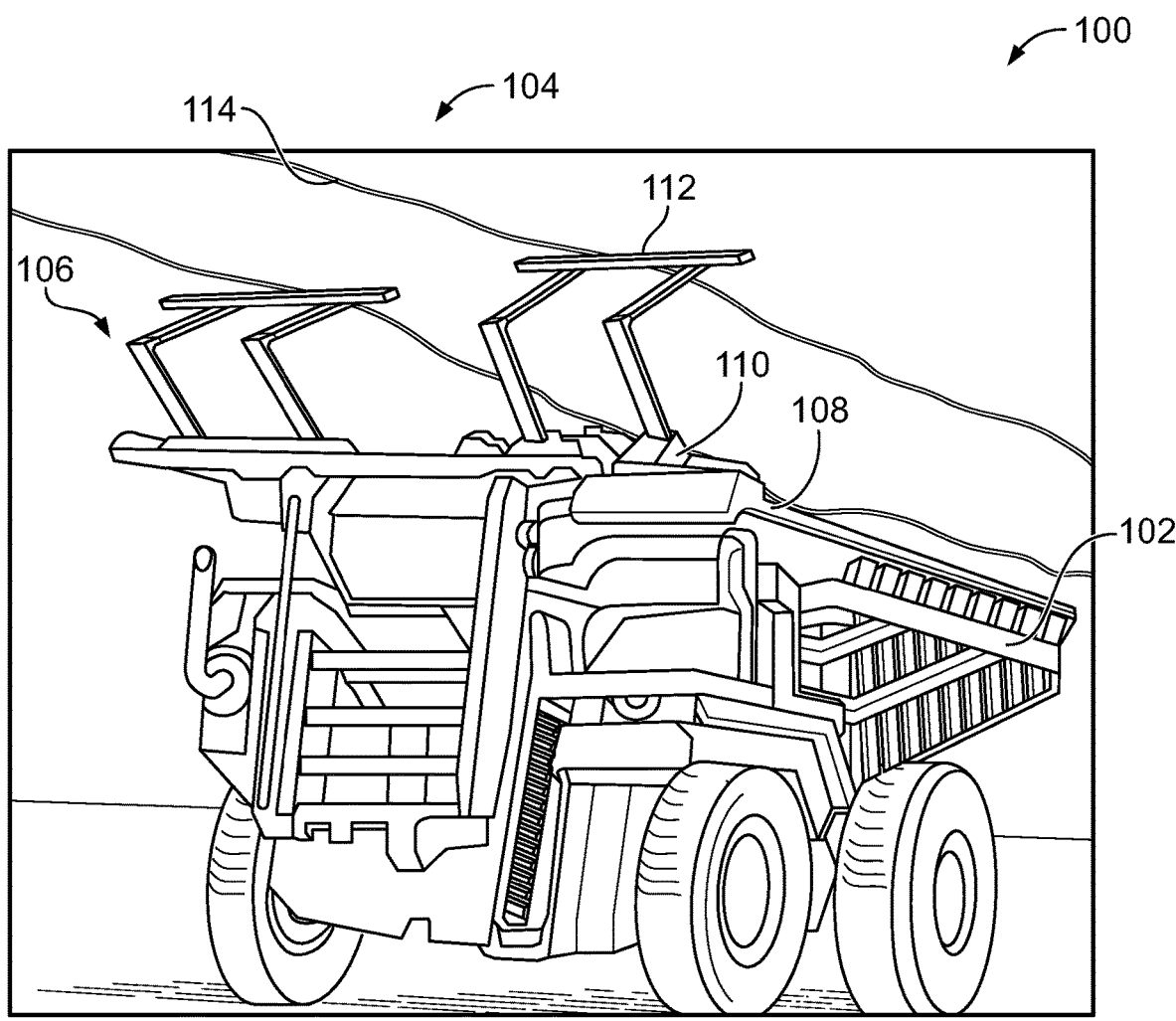
FIG. 1 illustrates a perspective view of a vehicle power delivery system of one example embodiment.

FIG. 1 illustrates an example trolley assembly 100 in accordance with one example. In this example, the trolley assembly 100 may have a vehicle 102 and a vehicle power delivery system 104 that includes a pantograph 106. While in this example an off-highway haul truck is illustrated, in other examples, the vehicle 102 may include automobiles, trucks, buses, mining vehicles, rail vehicles, off-highway vehicles (OHV), etc. Also, while in this example, a pantograph 106 is provided, in other examples a bow collector, trolley pole, or the like, may be provided. The vehicle 102 includes a body 108 that receives the pantograph 106.

The pantograph 106 includes a mast 110 that projects upwardly from the vehicle 102, and supports at least one collection arm 112 that extends from the mast 110. In one example, the mast 110 may be welded to the body 108, whereas in other examples, the mast 110 may be bolted to the body 108 to allow removal of the pantograph 106 from the vehicle 102. The collection arm 112 extends from the mast 110 to engage and receive current from an off-board current source 114 while the vehicle travels along one or more routes. In this example, the off-board current source 114 is an overhead line that is electrically connected to an electric power grid. Four collection arms 112 are illustrated and are movably and pivotably coupled to the mast 110. In this manner, when the vehicle 102 is not receiving current from the off-board current source 114, the collection arms may be lowered within the vehicle 102 to facilitate driving of the vehicle on highways or other such roadways. Alternatively, the collection arms 112 may be retractable from the mast 110 or body 108, permanently fixed to the mast 110 or body 108, or the like.

Figure 2:
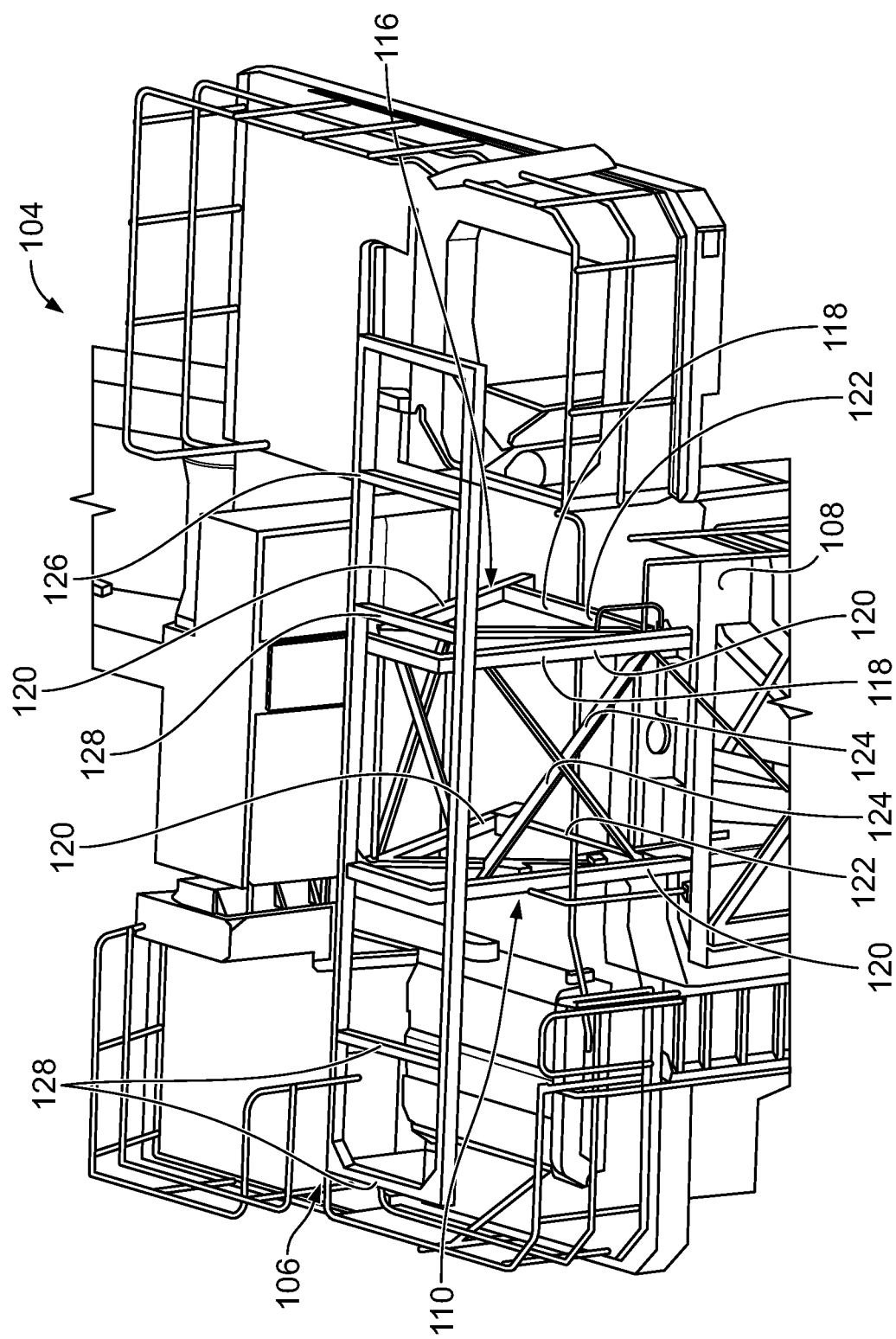
FIG. 2 illustrates a top schematic view of a vehicle power delivery system of one example embodiment.
Figure 3:
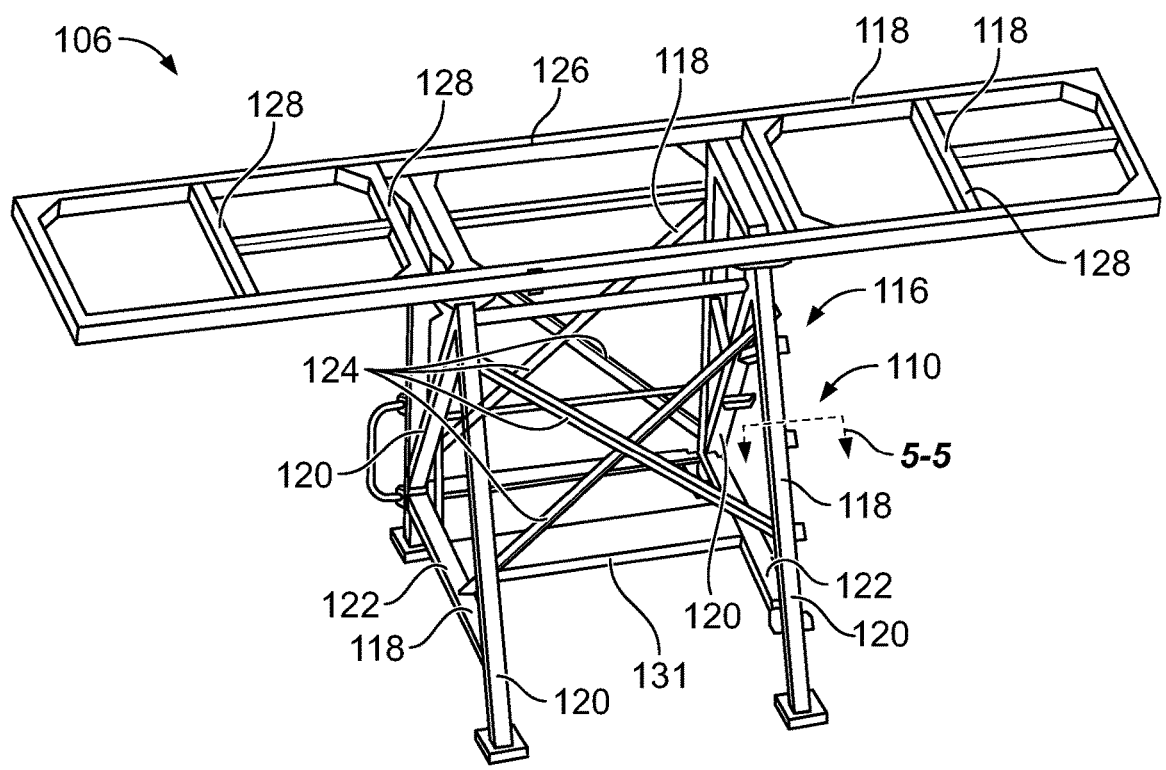
FIG. 3 illustrates a top perspective view of a pantograph of a vehicle power delivery system of one example.
Figure 4:
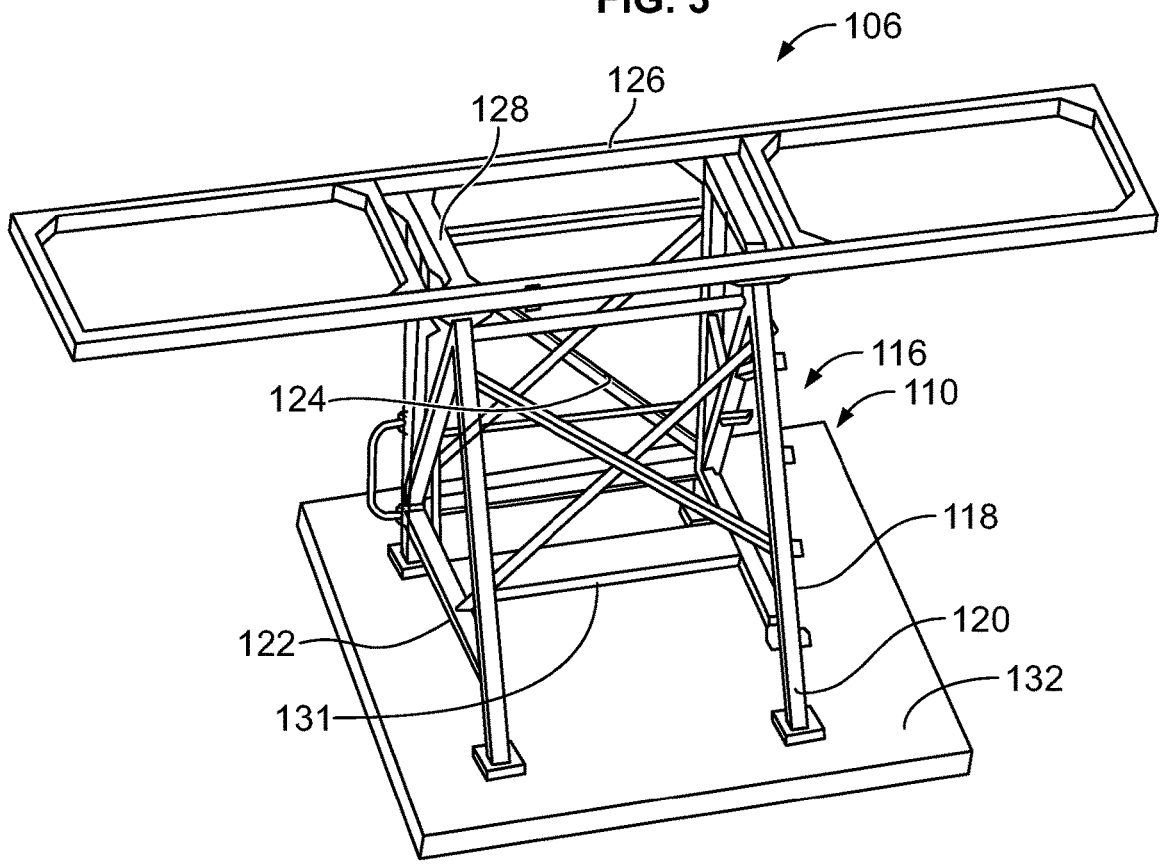
FIG. 4 illustrates a top perspective view of a pantograph of a vehicle power delivery system of one example.

FIG. 2 illustrates the power delivery system 104 with portions of the vehicle 102 removed. Similarly, the collection arms 112 have been removed also to facilitate explanation. FIG. 3 illustrates the pantograph 106 with the collection arms 112 removed. FIG. 4 illustrated the pantograph 106 of FIG. 3 removably mounted on a bus bar.

As illustrated in FIGS. 2 through 4, the mast 110 also includes a supporting structure 116 that includes one or more elongated, structural and inductive support members 118. An inductive support member 118 is a structure that provides structural support for the pantograph 106, while configured to function as an inductor for filtering current received by the pantograph 106. The support members may be inductors themselves such that the support members both (a) mechanically support the collection arm 112 above the vehicle and (b) operate as inductors as current is conducted from the off-board current source to the vehicle. In this manner, the inductive support member 118 is considered to include an integrated inductor that filters current conductive by the collection arm 112. The inductive support member(s) 118 may form an inductor having an inductance of at least 0.5 millihenries (mH). In one example, the inductive support member(s) may have an inductance between 0.1 mH and 3 mH.

With regard to the inductive support member 118, an inductor that is spaced from the pantograph 106 and coupled to the pantograph by another structure such as a cable or bus bar is not considered to provide structural support to the pantograph, and is thus not an inductive support member 118. Similarly, an inductor that sits on a shelf built into the pantograph 106, or positioned within the pantograph, but does not structurally support the pantograph 106, is not considered an inductive support member 118. However, an inductor that is part of, or directly coupled to the pantograph 106, and bears a load as a result of the weight of the pantograph 106 can be an inductive support member 118. Specifically, by being directly coupled, there is no intervening electrical components between the inductive support member 118 and pantograph. In this manner, an inductor that is positioned between the body 108 and pantograph 106 at an angle to support the pantograph 106 may be considered an inductive support member 118. In yet another example, the inductive support member 118 may be a bed of a vehicle that receives and supports the pantograph 106, with the bed functioning as an inductor. In another example, the inductive support member may be an inductor that may be part of, or may provide support directly to, the collection arm 112 of the pantograph and support a load from the collection arm 112. In one example, the load from the pantograph and/or collection arm supported by the inductive support member may be at least 1000 pounds (lbs), and in examples in a range between 1000 lbs and 10,000 lbs. In this manner, the support members may support a load in a range between 1000 lbs-10,000 lbs.

The inductive support members 118 may include vertical support members 120, horizontal support members 122, and cross support members 124. These members provide structural support to a frame 126 that receives the collection arms 112 (FIG. 1). While vertical typically indicates a structure 90° from a surface, or other structure, when used herein, vertical indicates that the elongated member extends further in the vertical direction than the horizontal direction. To that end, the vertical support members 120 illustrated all extend at an angle from the body 108, and if they continued to extend, would meet at a point to form a pyramid shape. Similarly, while horizontal indicates a structure 90° from a surface, or other structure, when used herein, horizontal indicates that the elongated member extends further in the horizontal direction than the vertical direction. To this end, in other example embodiments, the horizontal support members 122 may extend at an angle to one another or a vertical support member 120.

The frame 126 includes support members 128 along with locations configured to receive the collection arms 112. The frame 126 may be directly coupled to the inductive support members 118 of the mast. In particular, no intervening electrical components are provided between the frame 126 and the inductive support members 118. Alternatively, the support members 128 of the frame 126 may also be inductive support members that filter current received from the off-board current source 114. In one example, a cable is provided to direct current from the collection arms 112 to the inductive support members 118, whether the inductive support members 118 are part of the frame 126, vertical support members 120, horizontal support members 122, cross support members 124, or support members 128 of the frame 126. Similarly, a cable may be used to direct filtered current from the elongated inductive support member 118 to a propulsion system. Alternatively, a bus bar (FIG. 6) may be provided to direct the current from the collection arms 112 to an inductive support member 118, or from the inductive support member to the propulsion system.

In one example, the one or more inductive support members 118 may form a field replaceable unit. In particular, a field replaceable unit is a device or structure that may be removed from a vehicle 104, pantograph 106, or collection arm 112 for maintenance or replacement, e.g., by actuating bolts or other fasteners using a wrench or other tool, as opposed to (for example) removal via welding or another cutting operation. In one example, a horizontal support member 122 may be an inductive support member used to inductively filter current received from the collection arm 112. The horizontal support member 122 may be bolted to a flange of a vertical support member 120 to allow removal of the horizontal support member 122 for maintenance or replacement. When removed, the rest of the structure continues to support the pantograph 106 until the horizontal support member 122 can be put back in place, or replaced. While in this example, a single horizontal support member 122 is described, in other examples, the entire pantograph 106 may be removably coupled to the body 108 of the vehicle 104 to provide replacement of the pantograph 106. Alternatively, sections, or portions that include more than one support member may be removed from the pantograph 106 for maintenance and replacement.

By providing an inductor within one or more inductive support members 118, passive cooling is realized. Specifically, the inductive support members 118 are elongated and part of the support structure of the pantograph, allowing air to pass over them while the vehicle 104 is moving. Additionally, when the vehicle 104 is not conducting current, heat from the inductive support members is also transferred to the air. Additionally, the elongated inductive support members 118 have an increased surface area exposed to ambient air to improve heat transfer. In this manner, a cooling device, such as a fan, duct work, or the like may not be provided for cooling of an inductor. Instead, the movement of air across the pantograph can cool the inductive support members that can be heated by conduction of current through the members. Alternatively, a fan or cooling device, may still be provided, but the size and weight of the cooling device may be decreased compared to systems not using inductive support members.

The inductive support members 118 may be formed from laminated structural magnetic steel. In examples, an inductive support member 118 is an inductor 120, including one of an air core inductor, iron core inductor, ferrite core inductor, rebuild-type inductors, iron powder inductor, laminated core inductor, bobbin based inductor, toroidal inductor, ceramic inductor, etc. Specifically, the one or more inductive support members may have a square or rectangular cross-section (FIG. 4), circular cross-section, etc. In particular, the inductive support members 118 function as both an inductor and support structure, and in this manner the shape, form, and materials of the support member 118 may vary to provide a stronger support for handling the load of a pantograph, or for providing better electrical properties for functioning as an inductor.

As another example, the one or more inductive support members 118 may be formed from one or more elongated conductive members having a magnetic body inside the one or more conductive members. (FIG. 5) where both the magnetic body and conductive member may provide structural support. The one or more support members 118 may also be formed from one or more conductive coils helically wrapped around one or more dielectric bodies. (FIG. 6). While in some examples the dielectric body may be air, in other examples the dielectric body may be formed of a material that may supplement support for a given load.

Figure 7:
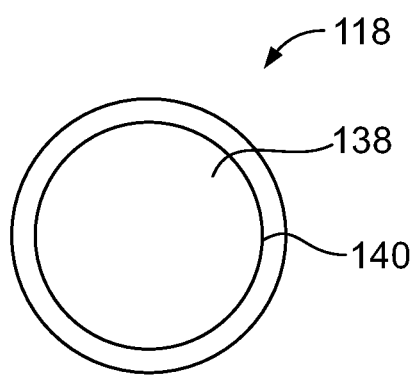
FIG. 7 illustrates a section view of an inductive support member of one example.

Alternatively, the one or more inductive support members 118 may be formed from one or more hollow elongated conductive members having a dielectric inside the one or more conductive members. (FIG. 7). Again, the hollow tube and potentially the dielectric may support a load. In addition, the hollow tube may be filled with epoxy, or other material to provide additional structural support without effecting electrical properties of the inductive support member. Similarly, an insulative material may be within the hollow tube and surround the dielectric material. The insulative material may include a square cross-section, rectangular cross section, circular cross-section etc., to supplement one or both of the electrical properties and/or structural properties of the inductive support members 118.

Figure 8:
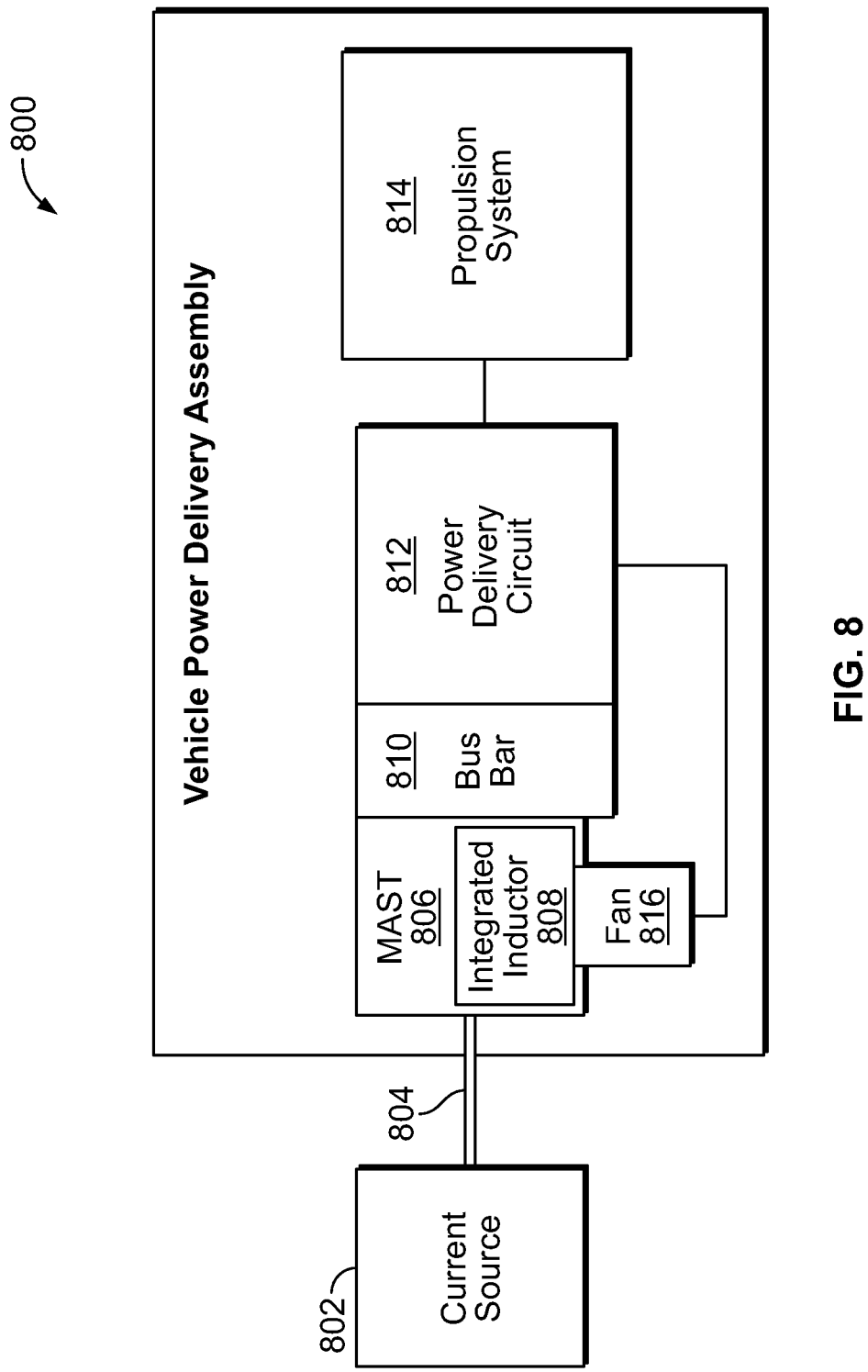
FIG. 8 illustrates a schematic block diagram of a vehicle power delivery system of one example.

As illustrated in FIGS. 2 through 4, the pantograph 106 may include flanges 128 that support the vertical support members 120 and provide a replaceable and direct coupling to the body 108 of the vehicle 104. Specifically, the flanges 128 may receive bolts for directly coupling, or engaging, the body 108. In the example of FIG. 4, the flanges 128 and corresponding bolt cause a direct coupling to both a bus bar 130 that receives the pantograph 106, and the body 108. The pantograph 106 can be coupled with the bus bar 130 so that the inductive support members 118 of the pantograph 106 are conductively coupled with conductive portions or traces in the bus bar 130. These conductive portions or traces in the bus bar 130 are conductively coupled with a power delivery circuit of a propulsion system (FIG. 8). Consequently, an additional cable, wire, or the like, between the inductive support members 118 of the pantograph 106 and the bus bar 130 may not be needed or used. Regardless of whether a bus bar 130, cable, wire, etc. is used, a conductive pathway is formed from the collection arm 112 to the propulsion system via the inductive support members 118. In other examples, other mechanical couplers may be provided to directly couple the pantograph 106 to the body 108, including rivets, screws, etc. Alternatively, the pantograph 106 may be welded to the body 108 of the vehicle 104 and include replaceable sections or support members to facilitate maintenance of the pantograph 106.

With reference to FIGS. 2 through 4, optionally, a support shelf 131 may also be provided within the mast 110. The support shelf 131, may be provided for additional storage, supplemental support, etc. In one example, the support shelf 131 may support a cooling fan (FIG. 8) to supplement cooling of the elongated inductive support members 118. As will be described in greater detail herein, the mast 110 and corresponding elongated inductive support members 118 are passively cooled as a result of air passing by the elongated inductive support members 118, and simply radiating heat to the environment when the pantograph 106 is not in use. Still, an additional cooling fan or cooling device may be placed on the support shelf 131 for supplemental or augmented cooling.

Figure 5:
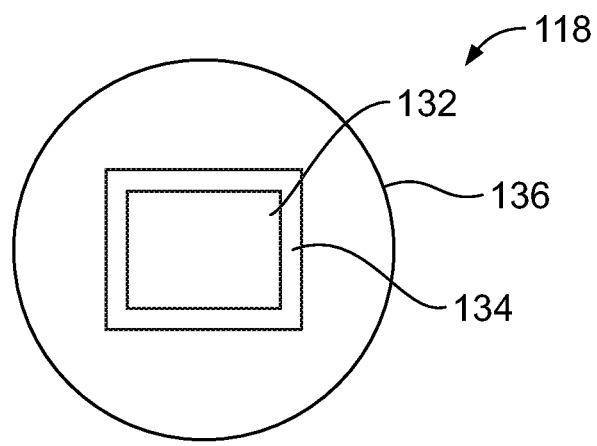
FIG. 5 illustrates a sectional view as taken along lines 5-5 in FIG. 3 of one example.
Figure 6:
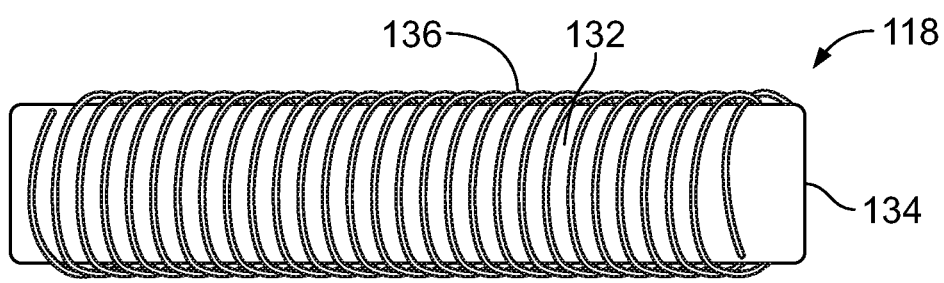
FIG. 6 illustrates a side plan view of support structure of one example.

FIG. 5 illustrates a sectional view of an example inductive support member 118. FIG. 6 illustrates a side view of a section of the inductive support member 118. The inductive support member 118 may include a conductive core 132 that is surrounded by a dielectric material 134. The conductive core 132 may be iron, ferrite, iron ferrite, laminated steel, a magnetic material, etc. The dielectric material 134 may include plastic, ceramic, or the like. An inductive coil 136 is helically wrapped around the outer surface of the conductive core 132 and dielectric material 134. The inductive coil 136 may be made of copper, include insulation material, be of size and shape and winding count based on the magnetic field required for filtering of the current received by a collection arm 112. In one example, more than one inductive support members 118 may be provided with a cross-coupled core.

In operation, the propulsion system (FIG. 8) receives current and has a power delivery circuit (FIG. 8) conditioned for receiving a direct current (DC) input. DC is formed from an alternating current (AC) input that is converted to provide the DC input. However, often ripple currents due to incomplete suppression of the AC current during the conversion may occur causing difficulties for the power delivery circuit conditioned to only receive DC. As a result, an inductor is used to reduce and eliminate ripple currents from reaching the power delivery circuit. In the examples of the Figures provided, DC current is provided by an off-board current source 114 and is inputted into the inductive coil 136 of the inductive support member 118. If a ripple current exists within the inputted current, this AC is introduced into the inductive coil 136. As the current across the inductive support member 118 varies, the magnetic field becomes time varying such that the change in current of AC induces voltage in the inductive support member 118. This induced voltage opposes the applied voltage, thereby creating a greater impedance to the AC (ripple) current as compared to the DC, thereby reducing the AC (ripple). This is sometimes referred to as choking or blocking the ripple current. As a result, only DC voltage is passed from an output of the inductive support member 118 to a DC link (cable, bus bar, etc.) to the power delivery circuit for use by the propulsion system. In one example, the inductive support member 118 is able to remove ripple current at frequencies of up to 50-60 Hz.

FIG. 7 illustrates an alternative sectional view of an example inductive support member 118. In this example, the inductive support member 118 may be a hollow elongated conductive member having an open interior 138 surrounding a dielectric material 140. In this manner, the air gap within the open interior 138 functions as an insulation material for the dielectric material 140. Alternatively, an insulation material may be placed within the open interior 138 to provide additional insulation. Similar to the inductive support member described in relation to FIGS. 6-7, this inductive support member filters ripple current in DC that is to be supplied to the propulsion system.

FIG. 8 illustrates a schematic illustration of a vehicle power delivery assembly 800 in accordance with one example embodiment. In one example, the vehicle power delivery assembly 800 is the vehicle power assembly 202 of FIG. 2. In another example, vehicle power delivery assembly 800 is trolley assembly 100 of FIG. 1.

The vehicle power delivery assembly 800 receives current from a current source 802. In one example, the current source 802 is one or more overhead lines, including from a catenary system that may be located above the vehicle. In another example, the current source 802 is a conductive rail of a rail vehicle that may be located below the body of the rail vehicle and engaging the wheels of the rail vehicle. In yet another example, the current source may be a wayside device that is located at the side of vehicle and located along a route or pathway of the vehicle. In each instance, the current source is located off-board and is an off-board current source.

A collection arm 804 electrically couples, and physically engages the current source 802 as described in any of the embodiments described in relation to FIGS. 1-7. Similarly, a mast 806 may be coupled to the collection arm 804 to provide structural support to the collection arm 804 in relation to a vehicle. The mast 806 may include frame members, cross bar members, support legs, shoe elements, etc. to support the collection arm 804 as described in detail in relation to FIGS. 1-7.

An integrated inductor 808 may be integrated with at least one of the collection arm 804, or mast 806. In one example, the integrated inductor 808 may be directly coupled to the mast 806 by being removably and replaceably integrated into a support structure, or section of a support structure of the mast 806. Similarly, the integrated inductor 808 may be removably and replaceably integrated within the support structure of the collection arm 804 or section of the support structure of the collection arm 804. In one example, the integrated inductor 808 is integrated within both the collection arm 804 and the mast 806. Whereas in other embodiments, the integrated inductor is only integrated within one of the collection arm 804, or mast 806. The integrated inductor may be any inductor described in relation to FIGS. 1-7.

A bus bar 810 of a power delivery circuit 812 is electrically and directly coupled to at least one of the collection arm 804, or mast 806. In one example, the bus bar 810 engages the mast 806 to provide an electrical connection and pathway between the current source 802 and the propulsion system 814. Alternatively, the bus bar 810 is electrically and directly coupled to the collection arm 804 to provide an electrical connection and pathway between the current source 802 and the propulsion system 814. In yet another example, the bus bar 810 is electrically and directly coupled to both the collection arm 804 and the mast 806 to provide an electrical connection and pathway between the current source 802 and the propulsion system 814. In one example, the propulsion system 814 is located within a trolley cabinet, that in one example, is trolley cabinet 122 of FIG. 1. The current pathway extends from the current source to the bus bar of the power delivery circuit via the collection arm and/or mast where the current is inductively filtered by the integrated inductor.

The propulsion system 814 includes a transmission that powers traction motors to rotate axles of the vehicle. The transmission may be powered by the current received from an off-board current source that is filtered by an inductor to remove ripple current as described above and provided by the power delivery circuit 812. In one example, the traction motors are operated using only a battery that receives current from the off-board current source for charging. In other example embodiments, the propulsion system 814 is a hybrid system where the transmission receives both an electrical input from a battery charged by the electric current from the off-board current source, and mechanically from an engine, such as a diesel engine.

In one example, a fan 816 may be provided to cool the integrated inductor 808. The fan 816 may include its own independent power source, be powered by the current received from the current source 802, be powered by the propulsion system 814, or the like. In one example, the fan may include a sensor assembly coupled to one or more processors of a computing device that detects characteristics of interest in the environment to control operation of the fan 816. In one example, the characteristic of interest is the temperature of the integrated inductor 808. Once above a threshold temperature, the fan may automatically activate Alternatively, the characteristic of interest may be the speed of the vehicle. Specifically, the speed of the vehicle may be used to determine the air speed of air passing over the integrated inductor 808, and when below a threshold speed, the fan 816 may operate to supplement the natural air cooling. The fan 816 may operate to increase and decrease fan speed based on the air speed passing over the integrated inductor 808 to ensure cooling at a predetermined rate is achieved. Similarly, the sensor may detect the air speed of air passing over the integrated inductor 808, with the air speed being the characteristic of interest. Thus, the fan may be operated to cool, or supplement cooling of the integrated inductor 808.

Figure 9:
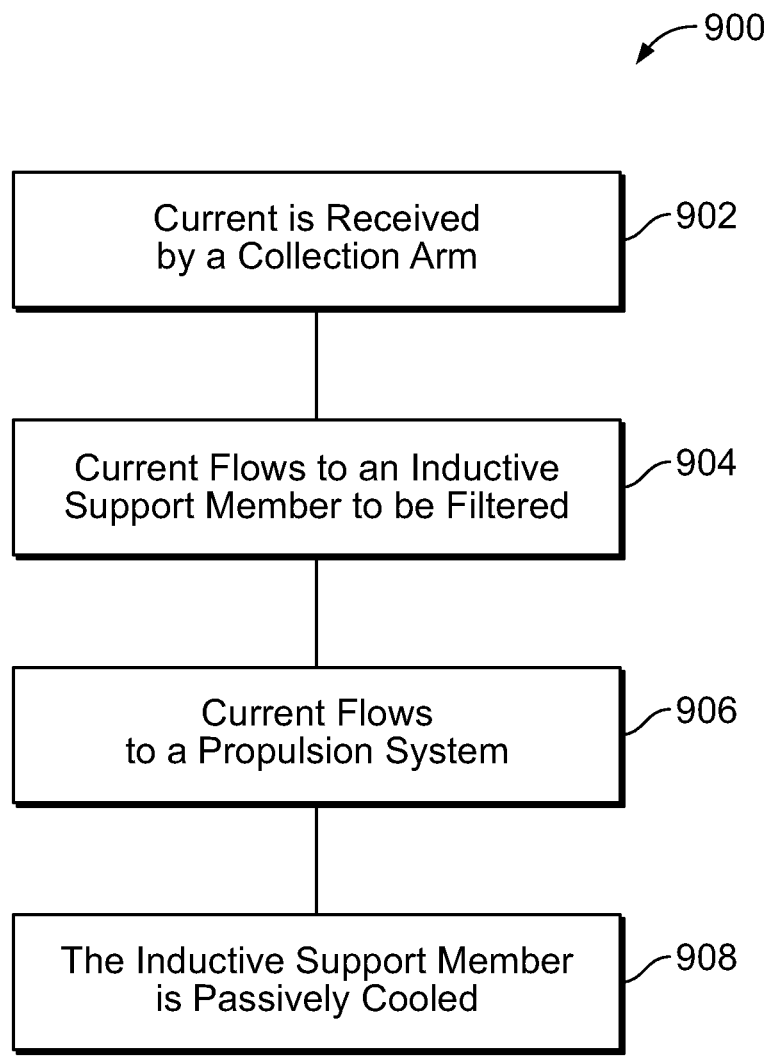
FIG. 9 illustrates a schematic block flow diagram of a method for delivering power to a vehicle of one example.

FIG. 9 illustrates a method 900 for delivering power to a vehicle. The vehicle may include automobiles, trucks, buses, mining vehicles, rail vehicles, off-highway vehicles (OHV), etc. In one example, the vehicle is vehicle 102 of Figure.

At 902, current is received by a collection arm. In one example, the collection arm is collection arm 112 of FIG. 1 that is part of a pantograph that engages electric cables. In another example, the collection arm 112 may be a shoe that engages a rail that carries an electric current. The collection arm may be any structure that can conduct current from an off-board current source to bring the current to an on-board for use. The current may be used by a propulsion system, engine, auxiliary device, or the like. To receive the current, the collection arm may be moved for engagement with the current source. As an example, a collection arm on a pantograph may pivot and extend upward, away from the vehicle to engage overhead electric cables.

At 904, the current received by the collection arm flows to an inductive support member to be filtered by the inductive support member. In one example, the current received has a frequency in a range between 50-60 Hz. In another example, the inductive support member is the inductive support member 118 of FIGS. 1-4. In other examples, the inductive support member is one of the inductive support members illustrated and described in relation to FIGS. 5-7. The inductive support member bears a load of the collection arm. In one example, the inductive support member is a support member in a framework provided to directly couple the collection arm to the vehicle. The inductive support member may be a vertical support member, horizontal support member, cross support member, angled support member, or the like. The inductive support member may be an inductor, including an air core inductor, iron core inductor, ferrite core inductor, rebuild-type inductors, iron powder inductor, laminated core inductor, bobbin based inductor, toroidal inductor, ceramic inductor, etc. The inductive support member by support a collection arm of a pantograph, shoe that engages a rail, or the like.

At 906, the current flows to a propulsion system. In one example, a cable is coupled to the inductive support member and the filtered current flows through the cable to the propulsion system. The current may be received by a power delivery circuit of a propulsion system that delivers the current to a battery used to propel the vehicle. In another example, a bus bar engages the inductive support member to deliver the filtered current to a power delivery circuit of a propulsion system. The inductive support member may directly couple and engage the bus bar via a flange and bolts that secure the inductive support member to the bus bar. In this manner, the inductive support member may be unbolted, and removed from being in contact with the bus bar for servicing or replacement.

At 908, the inductive support member is passively cooled to convey heat from the inductive support member. In one example, as a vehicle traverses across a route, air flows past an inductive support member to convey heat produced by the moving current and inductor into the ambient air. Similarly, when the inductive support member is not filtering current because the collection arm is not deployed, or in use, heat is conveyed to the ambient air to provide passive cooling of the inductive support member.

Thus, provided are vehicle power assemblies and trolley assemblies that integrate an induction member into a collection arm or mast to provide an induction filter for current received by the collection arm from an off-board current source. By placing the integrated inductor within a direct electrical pathway from the collection arm to a propulsion system, additional expense and room does not need to be provided for a separate induction device. Additionally, by being integrated within collection arm and/or mast, passive air cooling is provided to reduce complexity and weight of fans or other cooling devices required cool an inductor. Finally, the inductor may be provided as removable from the vehicle to enhance maintenance.

In one or more embodiments, a vehicle power delivery assembly is provided that includes a mast configured to couple with a vehicle such that the mast projects from the vehicle. A collection arm is configured to be coupled with the mast in a location apart from the vehicle to engage an off-board source of electric current that is off-board the vehicle while the vehicle moves along one or more routes. One or more of the mast or the collection arm is formed from at least one inductive support member that provides an integrated inductor of the one or more of the mast or the collection arm through which at least some of the electric current that is received from the off-board source of the electric current is filtered prior to being conducted to the vehicle.

Optionally, the at least one inductive support member is integrated into a supporting structure of the one or more of the mast or the collection arm. In one example, the mast is configured to be directly coupled with a bus bar of a power delivery circuit of the vehicle.

In one aspect, at least one of the mast or the collection arm is a field replaceable unit configured to be removable from the vehicle. Optionally, the integrated inductor provided by the at least one inductive support member is configured to filter one or more frequencies of the electric current as the electric current is conducted from the off-board source to a power delivery circuit of the vehicle without the electric current being conducted through another inductor that is outside of the mast and the collection arm.

In another example, the mast is configured to be coupled with the vehicle such that the collection arm is disposed above the vehicle to engage an overhead line as the off-board source of the electric current. In another aspect, the mast is configured to be coupled with the vehicle such that the collection arm is disposed below or to a lateral side of the vehicle to engage a conductive rail extending along the one or more routes.

Optionally, the at least one inductive support member is formed from laminated structural magnetic steel. Alternatively, the at least one inductive support member is formed from a conductive coil helically wrapped around a dielectric body. In yet another example, the at least one inductive support member is formed from an elongated conductive member having a magnetic body inside the conductive member. Alternatively, the at least one inductive support member is formed from a hollow elongated conductive member having a dielectric inside the conductive member. Optionally, the dielectric is an air gap inside the conductive member.

In an example, the dielectric is an insulative body disposed inside the conductive member. In another aspect, the collection arm and the mast are passively cooled based at least in part on movement of the vehicle. Optionally, the collection arm and the mast are force cooled based at least in part on operation of a fan.

In one or more embodiments a trolley assembly is provided that includes one or more elongated, structural and inductive support members configured to be coupled with each other and with a vehicle. The one or more elongated, structural and inductive support members form a mast that upwardly projects from the vehicle, and form a collection arm configured to be coupled with the mast to engage an overhead line of an off-board power source to receive electric current while the vehicle moves along one or more routes. The support members are configured to inductively filter the electric current received from the overhead line prior to the electric current being conducted to a propulsion system of the vehicle.

Optionally, the one or more support members are configured to be directly coupled with a bus bar of a power delivery circuit of the vehicle. In one aspect, the one or more support members form a field replaceable unit configured to be removable from the vehicle. Alternatively, the one or more support members are formed from laminated structural magnetic steel. In another example, the one or more support members are formed from one or more elongated conductive members having a magnetic body inside the one or more conductive members. Alternatively, the one or more support members are formed from one or more hollow elongated conductive members having a dielectric inside the one or more conductive members. Optionally, the one or more support members are formed from one or more conductive coils helically wrapped around one or more dielectric bodies.

In one or more embodiments a vehicle power delivery assembly is provided that includes a collection arm configured to engage an off-board source of electric current that is off-board a vehicle while the vehicle moves along one or more routes. The vehicle power delivery assembly also includes an inductive support structure configured to be coupled with the vehicle such that the inductive support structure projects from the vehicle. The inductive support structure is both mechanically supporting the collection arm above the vehicle and providing an inductor along a conductive pathway of the electric current from the collection arm to a propulsion system of the vehicle.

Optionally, the inductive support structure is a field replaceable unit configured to be removable from the vehicle. In another aspect, the inductive support structure is configured to filter one or more frequencies of the electric current as the electric current is conducted from the off-board source to the propulsion system of the vehicle without the electric current being conducted through another inductor that is outside of the inductive support structure.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

The invention claimed is:

1. A vehicle power delivery assembly comprising:
   a mast configured to couple with a vehicle such that the mast projects from the vehicle; and
   a collection arm configured to be coupled with the mast in a location apart from the vehicle to engage an off-board source of electric current that is off-board the vehicle while the vehicle moves along one or more routes,
   wherein one or more of the mast or the collection arm is formed from at least one inductive support member that provides an integrated inductor of the one or more of the mast or the collection arm through which at least some of the electric current that is received from the off-board source of the electric current is filtered prior to being conducted to the vehicle.

2. The assembly of claim 1, wherein the at least one inductive support member is integrated into a supporting structure of the one or more of the mast or the collection arm.

3. The assembly of claim 1, wherein the mast is configured to be directly coupled with a bus bar of a power delivery circuit of the vehicle.

4. The assembly of claim 1, wherein at least one of the mast or the collection arm is a field replaceable unit configured to be removable from the vehicle.

5. The assembly of claim 1, wherein the integrated inductor provided by the at least one inductive support member is configured to filter one or more frequencies of the electric current as the electric current is conducted from the off-board source to a power delivery circuit of the vehicle without the electric current being conducted through another inductor that is outside of the mast and the collection arm.

6. The assembly of claim 1, wherein the mast is configured to be coupled with the vehicle such that the collection arm is disposed above the vehicle to engage an overhead line as the off-board source of the electric current.

7. The assembly of claim 1, wherein the mast is configured to be coupled with the vehicle such that the collection arm is disposed below or to a lateral side of the vehicle to engage a conductive rail extending along the one or more routes.

8. The assembly of claim 1, wherein the at least one inductive support member is formed from laminated structural magnetic steel.

9. The assembly of claim 1, wherein the at least one inductive support member is formed from a conductive coil helically wrapped around a dielectric body.

10. The assembly of claim 1, wherein the at least one inductive support member is formed from an elongated conductive member having a magnetic body inside the conductive member.

11. The assembly of claim 1, wherein the at least one inductive support member is formed from a hollow elongated conductive member having a dielectric inside the conductive member.

12. The assembly of claim 11, wherein the dielectric is an air gap inside the conductive member.

13. The assembly of claim 11, wherein the dielectric is an insulative body disposed inside the conductive member.

14. The assembly of claim 1, wherein the collection arm and the mast are only passively cooled based at least in part on movement of the vehicle.

15. The assembly of claim 1, wherein the at least one inductive support member supports a load in a range between 1000 pounds and 10,000 pounds.

16. A trolley assembly comprising:
   one or more elongated, structural and inductive support members configured to be coupled with each other and with a vehicle to form a mast that upwardly projects from the vehicle and to form a collection arm configured to be coupled with the mast to engage an overhead line of an off-board power source to receive electric current while the vehicle moves along one or more routes, wherein the inductive support members are configured to inductively filter the electric current received from the overhead line prior to the electric current being conducted to a propulsion system of the vehicle.

17. The trolley assembly of claim 16, wherein the one or more support members are configured to be directly coupled with a bus bar of a power delivery circuit of the vehicle.

18. The trolley assembly of claim 16, wherein the one or more support members form a field replaceable unit configured to be removable from the vehicle.

19. The trolley assembly of claim 16, wherein the one or more support members are formed from laminated structural magnetic steel.

20. The trolley assembly of claim 16, wherein the one or more support members are formed from one or more elongated conductive members having a magnetic body inside the one or more conductive members.

21. The trolley assembly of claim 16, wherein the one or more support members are formed from one or more hollow elongated conductive members having a dielectric inside the one or more conductive members.

22. The trolley assembly of claim 16, wherein the one or more support members are formed from one or more conductive coils helically wrapped around one or more dielectric bodies.

23. A vehicle power delivery assembly comprising:
a collection arm configured to engage an off-board source of electric current that is off-board a vehicle while the vehicle moves along one or more routes; and
an inductive support structure configured to be coupled with the vehicle such that the inductive support structure projects from the vehicle, the inductive support structure both mechanically supporting the collection arm above the vehicle and providing an inductor along a conductive pathway of the electric current from the collection arm to a propulsion system of the vehicle;
wherein the inductive support structure is a field replaceable unit configured to be removable from the vehicle.

24. The assembly of claim 23, wherein the inductive support structure is configured to filter one or more frequencies of the electric current as the electric current is conducted from the off-board source to the propulsion system of the vehicle without the electric current being conducted through another inductor that is outside of the inductive support structure.

* * * * *